US008209765B2

(12) United States Patent
Pessolano

(10) Patent No.: US 8,209,765 B2
(45) Date of Patent: Jun. 26, 2012

(54) ELECTRONIC CIRCUIT DEVICE FOR CRYPTOGRAPHIC APPLICATIONS

(75) Inventor: Francesco Pessolano, Eindhoven (NL)

(73) Assignee: NXP B.V., Eindhoven (NL)

( * ) Notice: Subject to any disclaimer, the term of this patent is extended or adjusted under 35 U.S.C. 154(b) by 1024 days.

(21) Appl. No.: 10/553,790

(22) PCT Filed: Apr. 21, 2004

(86) PCT No.: PCT/IB2004/050478
§ 371 (c)(1),
(2), (4) Date: Oct. 19, 2005

(87) PCT Pub. No.: WO2004/095366
PCT Pub. Date: Nov. 4, 2004

(65) Prior Publication Data
US 2006/0288239 A1 Dec. 21, 2006

(30) Foreign Application Priority Data

Apr. 22, 2003 (EP) .................................... 03101094

(51) Int. Cl.
*G06F 21/00* (2006.01)
(52) U.S. Cl. ............................ 726/36; 713/300; 380/252
(58) Field of Classification Search .................... 726/26, 726/36, 34; 380/52, 287, 252–254; 713/300–340
See application file for complete search history.

(56) References Cited

U.S. PATENT DOCUMENTS

| 4,212,056 A * | 7/1980 | Kitamura et al. | ................ 363/96 |
| 6,320,770 B1 * | 11/2001 | Feuser | ............................ 363/59 |
| 6,419,159 B1 * | 7/2002 | Odinak | .......................... 235/492 |
| 6,498,404 B1 * | 12/2002 | Thüringer et al. | ............... 307/32 |
| 2004/0049698 A1 * | 3/2004 | Ott et al. | ........................ 713/201 |

FOREIGN PATENT DOCUMENTS

| DE | 19822220 A1 | * 11/1999 |
| WO | WO 00 19366 | 4/2000 |
| WO | WO 00 26746 | 5/2000 |
| WO | WO 00 63827 | 10/2000 |

OTHER PUBLICATIONS

Patterson, David A., John L. Hennessy, and David Goldberg. Computer Architecture : A Quantitative Approach. Greensboro: Morgan Kaufmann, 1995. 134-35.*

* cited by examiner

*Primary Examiner* — Kim Vu
*Assistant Examiner* — John B King

(57) ABSTRACT

The electronic circuit executes operations dependent on secret information. Power supply current dependency on the secret information is cloaked by drawing additional power supply current. A plurality of processing circuits (102, 106) executes respective parts of the operations dependent on the secret information. An activity monitor circuit (12a, b, 14), coupled to receive pairs of processing signals coming into and out of respective ones of the processing circuits, derive activity information from each pair of processing signals. The activity monitoring circuit (12a, b, 14) generates a combined activity signal indicative of a sum of power supply currents that will be consumed by the processing circuits (102, 106) dependent on the processing signals. A current drawing circuit connected to the power supply connections is controlled by the activity monitor circuit (12a, b, 14) to draw a cloaking current controlled by the combined activity signal, so that power supply current variations dependent on the secret information are cloaked in a sum of the cloaking current and current drawn by the processing circuits (102, 106).

10 Claims, 2 Drawing Sheets

ELECTRONIC CIRCUIT DEVICE FOR CRYPTOGRAPHIC APPLICATIONS

The invention is related to an electronic circuit device, and in particular an integrated circuit device such as a smart card, that is arranged to perform cryptographic computations.

Recently it has been realized that an analysis of the time dependence of the power supply current consumed by an integrated circuit could be used to identify secret information, such as a decryption key, when that secret information is processed in the integrated circuit. In response, various solutions have been proposed to cloak the effect of the secret information on the power supply current consumption.

WO 00/26746 discloses the use of a load circuit to draw additional power supply current in parallel with the secret information dependent power supply current. It is proposed to use a complementary circuit in addition to the circuit that draws secret information dependent power supply current, which will be called the functional circuit. The complementary circuit and the functional circuit contain similar circuit elements and the complementary circuit has complementary circuit nodes that correspond to circuit nodes in the functional circuit.

In each clock cycle when the logic level of a circuit node in the functional circuit does not change the logic level of the corresponding node in the complementary circuit is made to change and vice versa, when the logic level of a circuit node in the functional circuit does change, the logic level of the corresponding node in the complementary circuit does not change. Thus, the number of logic level changes in the combination of the functional circuit and the complementary circuit does not depend on the secret information. As a result the sum of power supply current consumption of the functional circuit and the complementary circuit is constant, independent of the secret information.

Other documents show power supply current regulation techniques that use a feedback loop to keep the power supply current constant. This has the same result on the average power supply current as using complementary transitions, but it does not cloak the difference in the pulses in power supply current. WO 00/19366 discloses an advanced solution in which these pulse differences are eliminated by drawing the secret information dependent power supply current from a capacitive internal power supply node that is disconnected from the external power supply connection most of the time. The internal power supply node is connected to the external power supply for charging only when the cumulative charge consumption by the power supply current makes this necessary. To cloak the effect of the secret information on the overall power supply consumption the power supply consumption must be regulated to a constant level.

However, a disadvantage of keeping power supply at a constant level to cloak secret information is that a fairly high level of power supply current must be maintained. Other techniques have sought to overcome this problem. U.S. Pat. No. 6,419,159 discloses the addition of random power supply current fluctuations, rather than just complementary power supply current fluctuations. This reduces the correlation between the secret information and the power supply current fluctuations. WO 00/63827 discloses power supply voltage regulation with a randomly variable power supply voltage to cloak power supply current variations due to the secret information. This type of cloaking, however, may still be sensitive to statistical techniques of analyzing the secret information.

Among others, it is an object of the invention to provide for cloaking of the effect of secret information on the power supply current of an integrated circuit that is responsive to the actual effect of the secret information, but which is more flexible than the use of complementary nodes.

The integrated circuit according to the invention is set forth in Claim 1. In the integrated circuit an activity monitor is used, which uses pairs of processing signals that come into and out of processing circuits that process secret information. The measurements of the activity of different processing circuits are summed and the sum is used to control a cloaking current that is drawn from the power supply so as to cloak the dependence on the secret information.

By using a sum of the activities more flexible cloaking is possible than in the prior art solution where a complementary node is present for each node in the functional circuit. This reduces the power supply current required for cloaking, because a transition in some circuits in the functional circuit can compensate the lack of a transition in other circuits in the functional circuit, without having to generate a complementary transition for each node in the functional circuit where no transition occurs. The use of activity measurements makes it possible to realize faster and more accurate cloaking than with power supply current regulation.

It should be noted that in an embodiment the cloaking current drawn by the current drawing circuit does not necessarily have the same sign as the current drawn by the processing circuits. When the processing circuits draw a net charging current for charging output nodes of logic circuits, the current drawing circuits may supply a net discharging current for discharging output nodes of logic circuits and vice versa. In addition the cloaking current may include a component of constant sign. In another embodiment the entire cloaking current always has the same sign.

In an embodiment of the integrated circuit according to the invention the circuit is clocked and the activity dependent cloaking power supply current is supplied synchronized by the clock signal. Thus, also the pulse pattern of the power supply can be cloaked.

In another embodiment of the integrated circuit to the invention the integrated circuit is pipelined and current drawing circuits for drawing cloaking current are provided per pipeline stage. Thus, pipeline stage specific dependence on secret information can be cloaked.

In another embodiment the cloaking current is enabled only upon reception of a trigger signal that triggers or accompanies execution of a secret information dependent process in the integrated circuit. Thus power supply current drain that is not needed for cloaking is avoided.

In another embodiment a time dependent reference pattern is generated in response to the trigger signal and the cloaking current is adapted so that the total of the power supply current consumed by the processing circuits and the cloaking current varies as the reference pattern. Thus, processing of fake secret information can be simulated.

These and other objects and advantageous aspects of the invention will be set forth using the following Figs.

Figure 1:
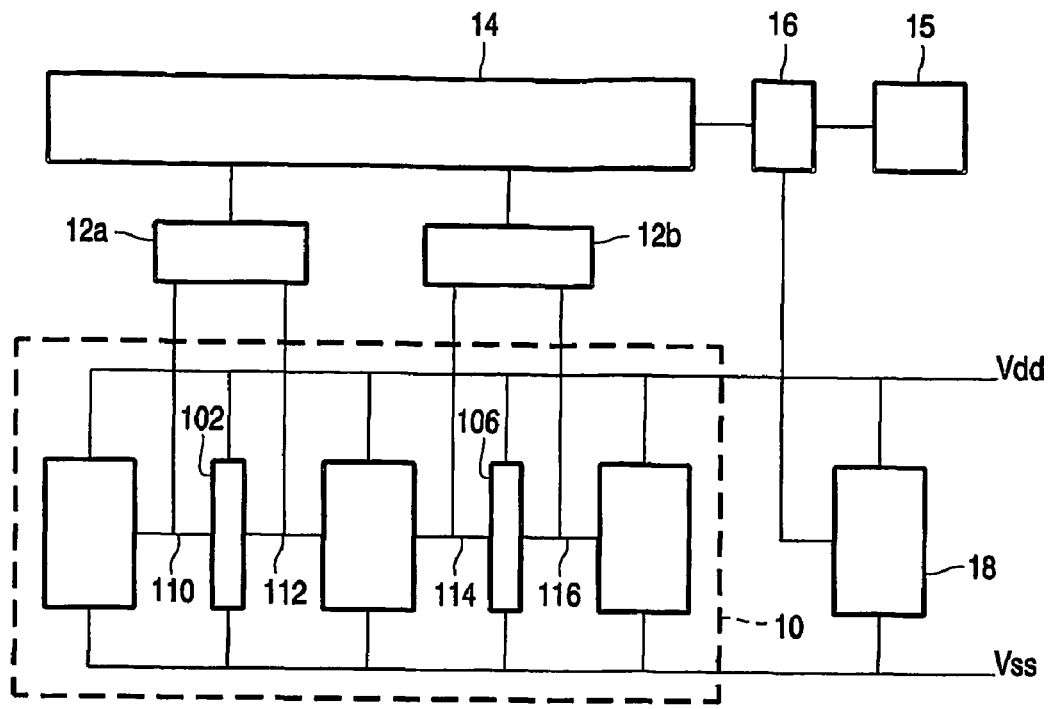
FIG. 1 shows an integrated circuit

FIG. 1 shows an integrated circuit that comprises a processing unit 10, activity detection circuits 12a,b, an activity summing circuit 14, a reference pattern generator 15, a subtractor 16 and a current drawing circuit 18. Processing unit 10 is shown to contain a number of interconnected processing circuits. Two processing circuits 102, 106 have inputs 110, 114 and outputs 112, 116 connecting these processing circuits to other processing circuits. Input 110 and output 112 of a first processing circuit are coupled to the inputs of a first activity detection circuit 12a. Input 114 and output 116 of a second processing circuit 106 are coupled to the inputs of a second activity detection circuit 12b. Outputs of activity detection circuits 12a,b are coupled to activity summing circuit 14. Subtractor 16 has inputs coupled to outputs of activity summing circuit 14 and reference pattern generator 15 and an output coupled to current drawing circuit 18. Current drawing circuit 18 and processing circuits 102, 106 receive power supply current from power supply connections Vdd and Vss.

In operation activity detection circuits 12a,b determine the amount of activity of processing circuits 102 and 104 from the values of the input and output signals of these processing circuits 102, 106. Activity measurement is known per se, and will therefore be described only briefly. The amount of activity A indicates whether a processing circuit 102, 106 has to generate a logic level transition. Power consumed by the processing circuit 102, 106 increases when activity occurs. In one embodiment processing circuits 102, 106 are registers. In this case, the activity occurs when the register is clocked and the input data will give rise to output data unequal to the measured output data. In this case the activity A is the difference Nup-Ndown between a first number Nup of registers that makes a transition from logic low to logic high and a second number Ndown that makes a transition from logic high to logic low. Upon receiving a clock signal to make these transitions the registers consume a power supply current pulse that provides a charge which is in fixed proportion to A. In another embodiment processing circuits 102, 106 are logic gates. In this case, too, the activity occurs when the input data of the gate will give rise to output data unequal to the measured output data Here to the current must provide a charge proportional to Nup-Ndown. In this case the transition is not enable directly by a clock signal.

Activity summing circuit 14 sums the amounts of activity determined by the different activity detection circuits 12a,b and passes a net sum of the activity measured by the different activity detection circuits 12a,b to subtractor 16. Reference pattern generator generates a time dependent pattern (or time independent pattern) of the total power supply current through power supply connections Vdd, Vss that should be observable outside the integrated circuit. In a simple example the pattern requires a constant, time-independent current. Subtractor 16 generates a control signal to make current drawing circuit 18 draw an amount of current substantially equal to the required current minus the current that follows from the summed measured amount of current indicated by activity summing circuit 14.

In one embodiment activity detection circuits 2a,b each generate a current proportional to the difference between the input and output signals. In this embodiment activity summing circuit 14 forms an analog net sum current of these currents and uses a difference between a reference current from reference generator 15 and the net sum current to control the current drawn by current drawing circuit 18. However, without deviating from the invention activity detection circuits may generate digital difference signals, which are summed digitally in activity summing circuit 14. If all processing circuits 102, 106 whose activity is measured have been designed to consume the same power supply current upon a transition of data then all activities may be summed with equal weight.

If the processing circuits have mutually different designed current consumption the activities of different circuits should be weighed in the sum, according to the current designed consumption (which depends in a known way on the Width/Length ratio's of the transistors involved). When processing circuits 102, 106 are registers it generally suffices to determine the difference between input and output signals to detect activity. In case the processing circuits are logic gates, some prior logic manipulation of the input and output signals may be required to determine activity, or more than one input and output signal may be required to determine activity of one logic circuit.

In a digital embodiment current drawing circuit 18 may for example have the form of any digital to analog converter (known per se), which converts a digitally coded value into an analog power supply current of required size, e.g. by selectively activating current sources of predetermined current strength.

In another digital embodiment current drawing circuit 18 may comprise for example a number of logic gates such as inverters (not shown), whose inputs are controlled by signal subtractor 16 and which have mutually equal output capacitances. In one embodiment subtractor 16 controls the numbers Nup, Ndown of these logic gates whose outputs are switched from respective logic levels to another, so that the sum of each of these numbers Nup, Ndown and the number of gates that make the same switches in the processing circuits 102, 106 is equal to the number prescribed by reference pattern generator 15. In this embodiment the activity detection circuits determine respective sums Nup and Ndown of the numbers of logic level transitions for different logic levels.

In another digital embodiment subtractor 16 controls the net number Nnet=Nup−Ndown of outputs of the logic gates that are switched, so that the sum of this net number and the net number of gates that are switched between that make the same in the processing circuits 102, 106 is equal to the number prescribed by reference pattern generator 15. Thus discharge of capacitive charge at the output node of the gates in current drawing circuit 16 may be used to provide current to charge output capacitances of gates in the processing circuits 102, 106 and vice versa, which leads to less power supply current consumption. In this embodiment the activity detection circuits need to determine only the net sum Nnet=Nup−Ndown of the numbers of logic level transitions for different logic levels; the individual numbers Nup, Ndown need not be determined separately.

Preferably gates with mutually equal output capacitances are used in current drawing circuit 18, so that only the number matters of gates that is switched. In another embodiment, gates with mutually different output capactances are used, for example output capacitances that differ by a factor of a powers of an integer radical R like 2. In this case each time current drawing circuit would have to switch R logic gates of a certain output capacitance it may switch one logic gate with an R times larger output capacitance instead. This number of logic gates can be reduced.

It will be appreciated that it is not necessary to detect activity of all processing circuits. It suffices to measure activity of those circuits that are substantially affected by the secret information. Even among those circuits it may suffice to detect activity only of the circuits that are most affected by the secret information, or only of circuits whose activity is known to be proportional to the activity of other circuits, whose activity is not separately measured. For example, only activity of registers in a pipelined processing unit may need to be measured, when the activity in combinatorial logic circuits follows from the activity of the registers.

Figure 2:
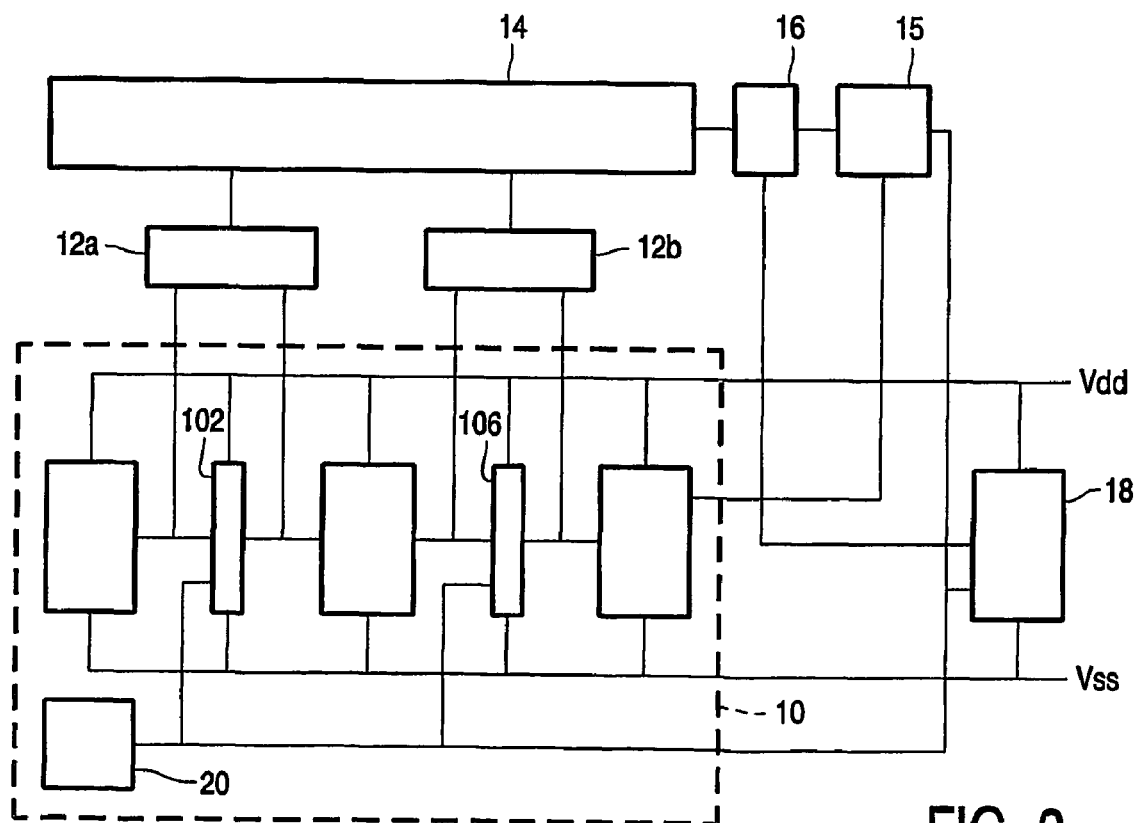
FIG. 2 shows an integrated circuit with a clock circuit

FIG. 2 shows a further embodiment of the integrated circuit. FIG. 2 shows a clock circuit 20 coupled to processing circuits 102, 106 (which are registers in this embodiment) and to current drawing circuit 18. In operation, activity detection circuits 12a,b signal whether or not the input signals of registers 102, 106 are such that a transition of a stored value will occur in registers 102, 106 upon a clock signal. That is, if registers 102, 106 copy their input to their output, activity detection circuits detect the difference between the input and output, but if the registers copy the inverse of the input to the output the difference between the output and the inverse of the input is determined.

Current drawing circuit 18 draws a cloaking current pulse with a total charge content dependent on the net number Nup-Ndown of registers 102, 106 that will make an upward transition. Current drawing circuit 18 draws this current with a pulse at a time point determined by the clock signal, so that the current pulse substantially coincides with the pulse caused by the transition in the registers, which is also triggered by the clock signal.

FIG. 2 also shows a connection between one of the circuits in processing unit 10 and reference pattern generator 15 to trigger generation of the reference pattern, as well as a connection from clock circuit 20 to reference pattern generator 15. In operation processing unit 10 executes a program of instructions, at least part of which involve secret information. Execution of successive instructions is clocked by clock circuit 20. The program contains an instruction that, when executed, triggers the reference pattern generator. Reference pattern generator contains a programmed temporal pattern of a required time dependent supply current and starts generating successive steps of this pattern upon being triggered, so that the steps of the pattern occur in synchronism with execution of successive instructions of the program that follow the instruction that triggers generation of the pattern. These successive instructions process secret information.

Thus, by using an instruction to trigger the pattern it can be ensured that the effect of the secret information is cloaked. In one embodiment, the programmed temporal pattern equals the pattern of activity that would occur when the processor would execute the instructions with a given value of the secret information (other than the actual value), so that it appears from the total power supply current that the given value is processed. Although FIG. 2 shows the connections to reference pattern generator 15 shown together with the clocking of current drawing circuit 18 and application to the activity of registers 102, 106, it will be appreciated that these two changes may be applied independently of one another.

Similarly, it will be appreciated that the invention is not limited to execution of programs. A secret information dependent process may be executed in any way (e.g. by means of a program or by means of dedicated hardware), after being triggered by some signal in the integrated circuit. In response to this trigger signal, or to some signal that accompanies the process, reference pattern generator 15 is triggered to generate the reference pattern in step with execution of the secret information dependent process, so as to define the total required current. In another embodiment, the pattern is merely a constant current, but the cloaking circuit from current drawing circuit 18 is activated only during a time window of a number of clock cycles started in response to the trigger signal, so that current drawing circuit 18 is not or only slightly active when no secret information is processed. It will be appreciated that in the latter case the precise structure of FIG. 2 is not needed: a disable/enable signal to disable/enable the cloaking current in specific clock cycles may be applied anywhere in the cloaking circuit, for example in current drawing circuit 18, or in the activity measurement circuits.

Figure 3:
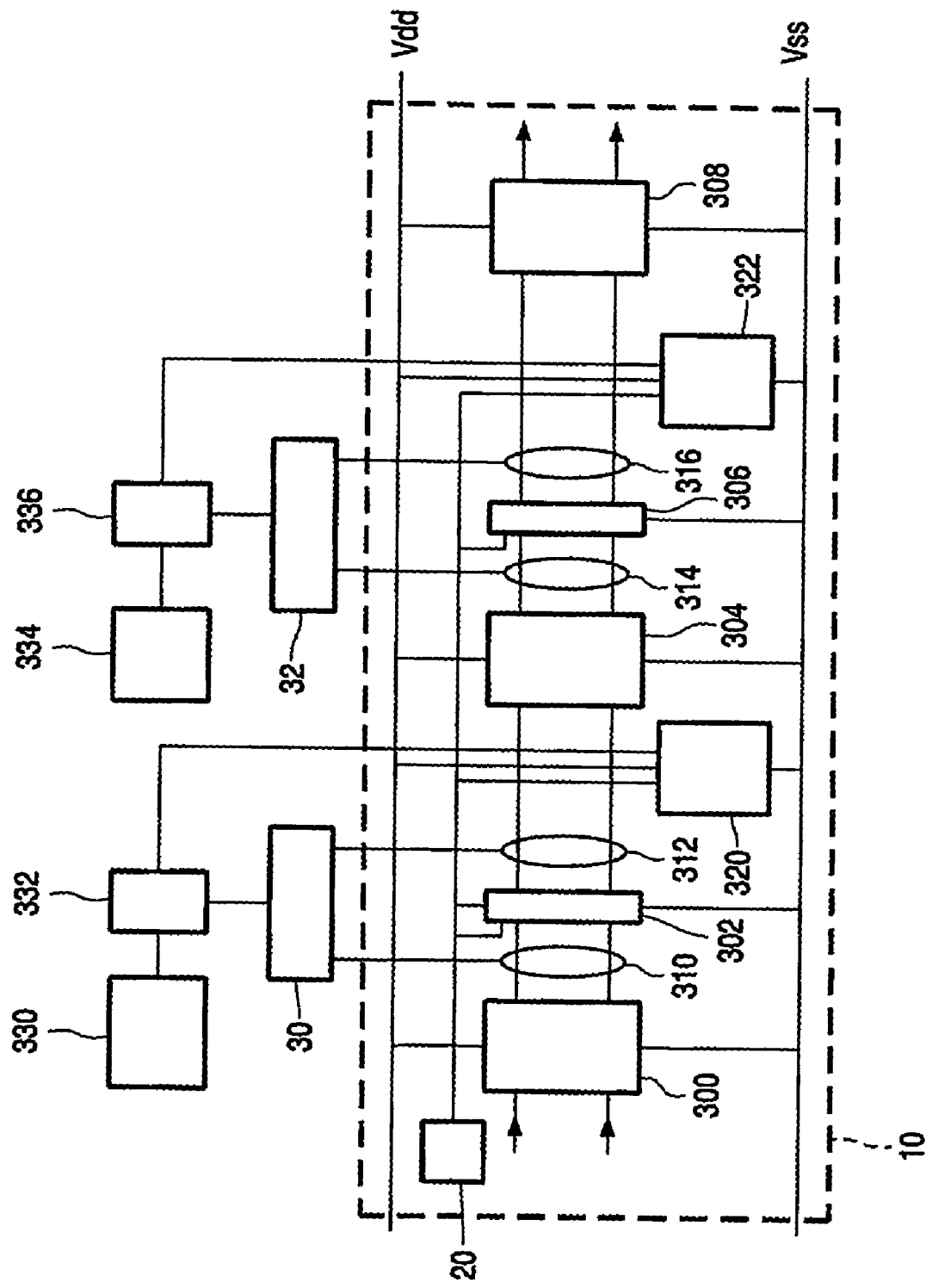
FIG. 3 shows an integrated circuit with a pipeline structure

FIG. 3 shows a further integrated circuit, wherein the processing unit contains a number of pipeline stages, each with combinatorial logic circuits 300, 304, 308. The combinatorial logic circuits of each pair of successive pipe-line stages is separated by a register 302, 306 for storing one or more bits in parallel. Respective registers 302, 306 define the borders between successive pipeline stages. For each border an activity measuring circuit 30, 32, a reference pattern generator 330, 334, a subtractor 332, 336 and a current drawing circuit 320, 322 is provided. The activity measuring circuits 30, 32 are coupled to the inputs and outputs of the registers 302, 306 or at least to those of the input and outputs that carry data bits for which it is known in advance that they may depend on secret information.

Although only three stages of combinatorial logic 300, 304, 308 and two registers 302, 306 with accompanying cloaking circuits are shown it will be appreciated that more pipe-line stages with intervening registers may be present, each with their own cloaking circuit.

In operation each activity measuring circuit 30, 32 measures the difference between the multiple bit inputs 310, 314 and the multiple bit outputs 312, 316 of the register 302, 306 at a border between a respective pair of pipeline stages. The output of each activity measuring circuit 30, 32 is fed to a respective subtractor 332, 336, which compares the activity with a value from a reference activity pattern generated for the register of the relevant pipeline stage (generated by pipe-line stage specific reference pattern generators 330, 334). The result of the comparison is fed to a current drawing circuit 320, 322 for the particular stage, to cause the current drawing circuit to draw a current that cloaks the secret information of the power supply current drawn by the pipeline stage. Thus, cloaking is realized per pipeline stage.

In one embodiment reference pattern generators 330, 332 are triggered in synchronism with execution of instructions in the pipe-line stage that cause secret information dependent current to be drawn. As described, this may be realized for example by activating the cloaking circuit in response to a trigger signal that starts the secret information dependent process or that accompanies that process. In this case, reference pattern generators 330, 332 for each pipeline preferably generate the reference pattern substantially only for those clock cycles in which the process results in secret information dependent power supply current in the relevant pipeline stage. (Or instead a disable/enable signal may be generated for the cloaking current of the particular pipeline stage.) Thus, additional cloaking current needs to be drawn only for each particular pipeline stage when that particular pipeline stage executes a secret information dependent operation. This reduces power supply consumption.

The current drawing circuit 320, 322 for each pipe-line stage is preferably located close to the registers 302, 306 for the pipe-line stage for which the current drawing circuit cloaks the power supply current, e.g. closer to those registers than to registers coupled between of non-adjacent pipeline stages. Thus, location dependency of secret information related currents in the integrated circuit is suppressed, which makes it more difficult to reconstruct the secret information.

Although cloaking circuits are shown per pipeline stage, it will be appreciated that the cloaking circuits may also be provided for groups of pipeline stages that each form a subset of the pipeline or for the pipeline as a whole as in the embodiment of FIG. 2.

The invention claimed is:
1. An electronic circuit device for executing operations dependent on secret information, the electronic circuit device, comprising:
power supply connections;
a processing unit comprising a plurality of processing circuits for use in execution of respective parts of the opera- tions dependent on the secret information, the processing circuits being fed from the power supply connections;

an activity monitor circuit, coupled to receive pairs of processing signals, each of the pairs of processing signals including an input signal and an output signal of one of the processing circuits, the activity monitor circuit being arranged to derive activity information from each pair of processing signals, the activity information indicative of whether each of the processing circuits generates a logic level transition, and to derive from the activity information a combined activity signal indicative of a sum of power supply currents that will be consumed by the processing circuits dependent on the processing signals;

a current drawing circuit connected to the power supply connections and controlled by the activity monitor circuit to draw a cloaking current controlled by the combined activity signal, so that power supply current variations dependent on the secret information are cloaked in a combination of the cloaking current and current drawn by the processing circuits;

characterized in that the activity monitor circuit is coupled to receive a pair of processing signals for each of the processing circuits, coming into and out of the processing circuit respectively, the activity monitor circuit being configured to derive the activity information from each pair of processing signals and to derive from the activity information for said processing circuits the combined activity signal dependent on the processing signals indicative of the sum of power supply currents that will be consumed by said processing circuits in combination; the activity monitor circuit being coupled to the current drawing circuit to control generation of the cloaking current under control of the combined activity signal.

2. An electronic circuit device according to claim 1, wherein the processing unit comprises a clock circuit, combinatorial logic circuits and registers clocked by the clock circuit and connected between respective parts of the combinatorial logic circuits, the pairs of processing signals comprising pairs of input and output signals of the registers, the current drawing circuit being arranged to adjust a value of the cloaking current dependent on the activity of the registers at instants synchronized by the clock circuit.

3. An electronic circuit device according to claim 2, organized as a pipe-line of successive parts of the combinatorial logic circuits, each pair of successive parts coupled via a respective one or respective ones of the registers, the electronic circuit device, comprising:

a plurality of activity monitor circuits each coupled to receive pairs of input and output signals of the respective one or ones of the registers between a respective pair of successive parts of the combinatorial logic circuits, and to derive a combined activity signal from the pairs of input output signals;

a plurality of current drawing circuits connected to the power supply connections, each controlled by a respective one of the activity monitor circuits to draw a cloaking current controlled by the combined activity signal derived by that respective one of the activity monitor circuits.

4. An electronic circuit device according to claim 3, arranged to activate the current drawing circuits in selected clock cycles, when the corresponding pipe-line stages process secret information.

5. An electronic circuit device according to claim 1, having a trigger input coupled to the current drawing circuit, arranged to enable drawing of the cloaking current only upon receiving a trigger signal that triggers or accompanies execution of a secret information dependent process in the electronic circuit device.

6. An electronic circuit device according to claim 1, comprising a reference current pattern generator, the current drawing circuit being arranged to adjust the value of the cloaking current so that the combination of the cloaking current and current drawn by the processing circuits substantially equals a temporal reference current pattern generated by the reference current pattern generator.

7. The electronic circuit device of claim 1, wherein the current drawing circuit is a digital to analog converter that is configured to convert a digitally coded value into an analog power supply current that is equal to the cloaking current.

8. A method of executing operations dependent on secret information in an electronic circuit, the method comprising:

supplying power supply current to processing circuits;

executing respective parts of operations that depend on the secret information using the processing circuits;

receiving pairs of processing signals coming into and out of each of the processing circuits, each of the pairs of processing signals including an input signal and an output signal of one of the processing circuits;

deriving activity information from each pair of processing signals, the activity information indicative of whether each of the processing circuits generates a logic level transition;

drawing a cloaking current controlled by the activity information, and combining the cloaking current with current drawn by the processing circuits so that power supply current variations dependent on the secret information are cloaked in the combination of the cloaking current and current drawn by the processing circuits, characterized by deriving from the activity information a combined activity signal indicative of a sum of power supply currents that will be consumed by all of the processing circuits in combination dependent on the processing signals; and controlling generation of the cloaking current with the combined activity signal.

9. The method of claim 8, further comprising determining the cloaking current by subtracting the sum of power supply currents from a temporal reference current pattern.

10. The electronic circuit device of claim 6, further comprising a subtractor that is configured to determine the cloaking current by subtracting the sum of power supply currents from the temporal reference current pattern generated by the reference current pattern generator.

\* \* \* \* \*